(12) United States Patent
Bachmann et al.

(10) Patent No.: US 8,369,876 B2
(45) Date of Patent: Feb. 5, 2013

(54) MOBILITY MANAGEMENT IN COMMUNICATION NETWORKS

(75) Inventors: Jens Bachmann, Langen (DE); Kilian Weniger, Langen (DE)

(73) Assignee: Panasonic Corporation, Osaka (JP)

( * ) Notice: Subject to any disclaimer, the term of this patent is extended or adjusted under 35 U.S.C. 154(b) by 675 days.

(21) Appl. No.: 12/302,262

(22) PCT Filed: May 15, 2007

(86) PCT No.: PCT/EP2007/004331
§ 371 (c)(1),
(2), (4) Date: Mar. 9, 2009

(87) PCT Pub. No.: WO2007/137703
PCT Pub. Date: Dec. 6, 2007

(65) Prior Publication Data
US 2010/0056175 A1 Mar. 4, 2010

(30) Foreign Application Priority Data
May 26, 2006 (EP) ...................................... 06010864

(51) Int. Cl.
*H04W 24/00* (2009.01)
(52) U.S. Cl. .................. 455/456.5; 455/519; 455/456.1; 370/338
(58) Field of Classification Search .......... 455/518–519, 455/456.1–457, 41.2, 432.1
See application file for complete search history.

(56) References Cited

U.S. PATENT DOCUMENTS

| | | | | |
|---|---|---|---|---|
| 5,570,412 A | * | 10/1996 | LeBlanc | 455/456.2 |
| 6,081,723 A | * | 6/2000 | Mademann | 455/456.1 |
| 6,810,259 B1 | * | 10/2004 | Zhang | 455/456.5 |
| 7,162,202 B2 | * | 1/2007 | Westman | 455/41.2 |
| 7,353,034 B2 | * | 4/2008 | Haney | 455/457 |
| 7,539,164 B2 | * | 5/2009 | Maenpaa et al. | 370/331 |

(Continued)

FOREIGN PATENT DOCUMENTS

| | | |
|---|---|---|
| EP | 1 047 275 | 10/2000 |
| EP | 1 460 869 | 9/2004 |

(Continued)

OTHER PUBLICATIONS

International Search Report dated Aug. 23, 2007.

(Continued)

*Primary Examiner* — Sharad Rampuria
(74) *Attorney, Agent, or Firm* — Dickinson Wright PLLC

(57) ABSTRACT

The invention relates to a method for tracking locations of mobile terminals in a communication network. Further, the invention relates to a communication network and apparatuses therein capable of performing individual steps of the method according to different embodiments of the invention. To decrease the signaling load imposed by mobility related signaling the invention suggests to group mobile terminals in so called mobility groups and to reduce the signaling overhead by performing a location update on a per-mobility group basis. In one exemplary embodiment of the invention this is realized by only one of the mobile terminals in a mobility group sending a group location update on behalf of the group to trigger the location update for the mobility group. Alternatively, in another embodiment of the invention, a network operator trusted or controlled entity sends a group location update on behalf of the group to trigger the location update for the mobility group.

31 Claims, 5 Drawing Sheets

U.S. PATENT DOCUMENTS

| | | | |
|---|---|---|---|
| 7,643,829 B2 | | 1/2010 | Hiyama |
| 7,904,103 B2 * | | 3/2011 | Sung et al. .................... 455/518 |
| 8,233,918 B2 * | | 7/2012 | Roin et al. ................. 455/456.3 |
| 2003/0008674 A1 * | | 1/2003 | Cudak et al. .................. 455/466 |
| 2004/0185876 A1 * | | 9/2004 | Groenendaal et al. ..... 455/456.5 |
| 2004/0235496 A1 * | | 11/2004 | Hiyama et al. ............. 455/456.1 |
| 2007/0105556 A1 | | 5/2007 | Hiyama |

FOREIGN PATENT DOCUMENTS

JP   2004-229078   8/2004

OTHER PUBLICATIONS

Il Han et al, "Group Location Tracking Based on Representative Identity and Virtual VLR for Transportation Systems," IEEE Communications Letters, IEEE Service Center, Piscataway, NJ, US, vol. 5, No. 8, Aug. 2001, XP011010392 ISSN: 1089-7798.

D. Johnson et al., Network Working Group, IETF RFC 3775, "Mobility Support in IPv6," Jun. 2004, pp. 1-165, p. 1, line 18.

C. Perkins, IETF RFC 3344, IETF RFC 3344, "IP Mobility Support for IPv4," Aug. 2002, pp. 1-99, p. 1, line 18.

3GPP TS 23.060: "General Packet Radio Service (GPRS); Stage 2 (Release 7)," version 7.0.0, section is 6.9.2, Mar. 2006, pp. 1-212, p. 2, line 9.

3GPP TR 23.882: "3GPP System Architecture Evolution: Report on Technical Options and Conclusions", version 1.0.0, Mar. 2006, pp. 1-114, p. 2, line 12.

Japanese Office Action dated May 29, 2012 with English translation.

* cited by examiner

MOBILITY MANAGEMENT IN COMMUNICATION NETWORKS

FIELD OF THE INVENTION

The invention relates to a method for tracking locations of mobile terminals in a communication network. Further, the invention relates to a communication network and apparatuses therein capable of performing individual steps of the method according to different embodiments of the invention.

TECHNICAL BACKGROUND

The movement of a terminal in a mobile communication networks requires location updates in order to stay reachable for the terminal. The current location of a terminal in the network is stored in a mobility management entity and every time the location is changed, the mobile terminal sends a location update message to this mobility management entity. Downlink packets destined to the terminal can then be delivered to the current location.

For example in an IP-based network, Mobile IP is an exemplary protocol supporting mobility. The mobility management entity in this protocol is referred to as the Home Agent (HA) and when the mobile terminal moves and attaches to a new subnet it configures a new IP address and registers this IP address as Care-of Address (CoA) with the HA. IETF RFC 3775, "Mobility Support in IPv6" and IETF RFC 3344, "IP Mobility Support for IPv4" (available at http://www.ietf.org) describe the protocol mechanisms for IP mobility support in IP-based networks for IPv6 and IPv4 networks, respectively, and are both incorporated herein by reference.

Concerning mobility management in cellular networks (e.g. UMTS) the terminals perform so-called location updates. A cellular network typically has a cellular structure where individual or plural radio cells may form a so-called location area. The network provides the terminals with information about the cell and location area they are currently located in. Typically, this is achieved by broadcasting system information in the radio cells from which the terminals may derive the respective information.

The terminals may compare the stored location area with the location area received from the network and whenever a terminal detects a change of the location area it performs a location update procedure.

In the exemplary case of UMTS the terminal sends a so-called Routing Area Update Request message, including its temporary identity and old routing area identity to the Serving GPRS Support Node (SGSN) and the Serving Radio Network Controller (SRNC) adds the routing area identity of the current area to the message. In case of an inter-SGSN Routing Area Update in idle mode, the new SGSN will request context information from the old SGSN (for details, please see 3GPP TS 23.060: "General Packet Radio Service (GPRS); Stage 2 (Release 7)" version 7.0.0, section is 6.9.2, incorporated herein by reference).

In the evolved 3GPP system architecture (see 3GPP TR 23.882: "3GPP System Architecture Evolution Report on Technical Options and Conclusions", version 1.0.0, available at http://www.3gpp.org and incorporated herein by reference) similar mechanisms are suggested for use to track a mobile terminal in evolved UMTS systems. Here the mobile terminal will send a so-called Tracking Area Registration message to the MME/UPE when the tracking area has changed as exemplarily shown in FIG. 1.

In the architecture described in 3GPP TR 23.882, the Mobility Management Entity (MME) manages and stores UE context (for idle state: UE/user identities, UE mobility state, user security parameters) and generates temporary identities and allocates them to UEs. It checks the authorization whether the UE may camp on the TA or on the PLMN. It also authenticates the user.

The User Plane Entity (UPE) terminates for idle state UEs the downlink data path and triggers/initiates paging when downlink data arrive for the UE. Moreover, the UPE manages and stores UE contexts, e.g. parameters of the IP bearer service or network internal routing information. The UPE may further also perform replication of the user traffic in case of interception.

As shown in FIG. 1, MME and UPE define functional entities in the network that are collocated in a network element. The MME/UPE 102, 103 are connected to a 3GPP radio access system that serves the UEs via base stations denoted enhanced Node Bs (or eNode B) of the evolved UMTS system. Further, the MME/UPE 102, 103 are connected to an Inter AS Anchor 101 providing connectivity to other networks. Further, it is assumed in FIG. 1 for exemplary purposes that the service area covered by the 3GPP Radio AS is segmented in different tracking areas (TAs) 104, 105, 106 that may also be denoted as location areas.

Every time a UE changes from one TA to another TA, it performs a tracking area registration procedure (or update) with its serving MME as indicated in FIG. 1.

E.g. when UEs 107, 108, 109 move to tracking area 104 (and assuming that the serving MME/UPE changes), each of the UEs 107, 108, 109 will initiate a tracking area registration procedure with the new serving MME/UPE 102. Since the MME/UPE has been changed, also an update of the User Plane Route between Inter AS Anchor 101 and the new MME/UPE 102 is performed. UEs 107, 108, 109 move together to tracking area 105, where they again individually perform a tracking area registration procedure with the serving MME/UPE 102. Further, upon movement of UEs 107, 108, 109 to tracking area 106, UEs 107, 108, 109 again perform a tracking area registration procedure with the new serving MME/UPE 103 which will also initiate a User Plane Route update for each of UEs 107, 108, 109 with Inter AS Anchor 101, since the serving UPE has been changed.

When several mobile terminals move together (e.g., terminals of travelers in a train), every single terminal sends a Tracking Area Registration and receives a Tracking Area Registration Confirmation every time the Tracking Area is changed and therefore a flooding of signaling messages is caused.

SUMMARY OF THE INVENTION

The object of the invention is to decrease the signaling load imposed by mobility related signaling.

The object is solved by the subject matter of the independent claims. Advantageous embodiments of the invention are subject matters of the dependent claims.

One main aspect of the invention is to group mobile terminals in so called mobility groups and to reduce the signaling overhead by performing a location update on a per-mobility group basis. In one exemplary embodiment of the invention this is realized by only one of the mobile terminals in a mobility group sending a group location update on behalf of the group to trigger the location update for the mobility group. Alternatively, in another embodiment of the invention, a network operator trusted or controlled entity sends a group location update on behalf of the group to trigger the location update for the mobility group.

According to a further embodiment of the invention, a method for tracking locations of mobile terminals in a communication network is provided wherein a mobility management entity assigns mobile terminals to a mobility group, and informs the mobile terminals on their mobility group membership. Further, a serving mobility management entity of the communication network may receive a group location update for the mobility group from a mobile terminal of the mobility group or a network operator trusted or controlled entity, and updates the locations of the mobile terminals of the mobility group based on the group location update. It should be noted that the mobility management entity performing the grouping and informing the mobile terminals thereon may not be the mobility management entity serving the mobile terminals upon having changed the location area.

In a further embodiment of the invention a network operator trusted or controlled entity may scan the identifiers of mobile terminals in its proximity and provides the scanned identifiers to the mobility management entity.

This information obtained from the network operator trusted or controlled entity may for example be used for assigning the mobile terminals identified by their respective terminal identifier to a mobility group associated to the network operator trusted or controlled entity according to another embodiment of the invention.

As indicated above, in another embodiment of the invention, the group location update may be transmitted by the network operator trusted or controlled entity to the serving mobility management node.

In a further embodiment of the invention a movement pattern of a respective mobile terminal may be determined and the mobile terminal is assigned to a mobility group based on the movement pattern. For example, the movement pattern is determined by the mobility management entity tracking location updates of the respective mobile terminal.

In a further embodiment of the invention, in which the determination of a movement pattern is advantageously supported by a terminal, the location update comprises an indication of at least one radio cell ID of at least one radio cell from which the mobile terminal receives or has received a beacon signal when/before sending the location update, a radio cell sojourn time in the respective radio cell and an average radio cell sojourn time in the visited radio cells since sending the last location update.

In a further embodiment of the invention, mobile terminals having a similar movement pattern are assigned to the same mobility group.

Another embodiment of the invention relates to mobility group selection by the mobile terminals. In this embodiment a group identifier of the mobility group is broadcast or multicast. The mobility management entity may receive a registration message from a mobile terminal comprising the group identifier and a mobile terminal identifier, and the mobility management entity assigns the mobile terminal to the mobility group identified by the group identifier.

In an alternative embodiment of the invention a registration message comprising a group identifier is received from a mobile terminal, and the mobility management entity assigns the mobile terminal to a mobility group identified by the group identifier.

Moreover, according to another embodiment of the invention the mobility management entity receives a group deregistration from a mobile terminal, and deregisters the mobile terminal from the mobility group in response thereto.

According to an exemplary embodiment of the invention only a selected mobile terminal out of the mobile terminals belonging to a mobility group may provide a group location update for all mobility group members to a serving mobility management entity.

Alternatively, in a further exemplary embodiment of the invention, the mobile terminals belonging to a mobility group randomly provide a group location update for all mobility group members to a serving mobility management entity.

When receiving a group location update at the serving mobility management entity, same may advantageously send a confirmation for the group location update to the mobility group members.

Further, for example in case the user plane route of data destined to the terminals of the mobility group is changed due to a change of the location area, the user plane route for the mobile terminals assigned to the mobility group may be reconfigured according to another embodiment of the invention. In particular, this update to the user plane route may be advantageous upon change of the serving user plane entity responsible for routing the user plane data to the mobile terminals of the mobility group.

In a further embodiment of the invention mobility-related contexts may be transferred from a previous mobility management entity to the serving mobility management entity upon reception of a group location update. This operation may be advantageous if for example the serving mobility management entity of a mobility group is changed when entering a new location area.

In another embodiment of the invention routing-related contexts may be transferred from a previous user plane entity to the serving user plane entity upon reception of a group location update. This may be advantageous if the serving user plane entity is changed due changing the location area.

It may be further advantageous if the transfer of the mobile terminal contexts is initiated by the serving mobility management entity by sending a message comprising at least the group identifier comprised in the group location update to the previous mobility management entity.

In another embodiment of the invention, the previous mobility management entity may be identified by comprising an identifier of the previous mobility management entity to the group location update or by resolving a previous location indicated in the group location update.

Another embodiment of the invention provides an apparatus for tracking locations of mobile terminals in a communication network. This apparatus may comprise a processing unit for assigning mobile terminals to a mobility group, and a transmitter for informing the mobile terminals on their mobility group membership.

Moreover, the apparatus may comprise a receiver for receiving at a serving mobility management entity of the communication network a group location update for the mobility group from a mobile terminal of the mobility group or a network operator trusted or controlled entity. The processing unit may further be operable to update the locations of the mobile terminals of the mobility group based on the group location update.

Another embodiment of the invention relates to an apparatus being operable to perform the steps of the method for tracking locations of mobile terminals according to one of the various embodiments above.

Moreover, an exemplary embodiment of the invention relates to a communication system for tracking locations of mobile terminals in a communication network. The communication system may be operable to group the mobile terminals into at least one mobility group and to perform a location update on a per-mobility group basis.

Another exemplary embodiment of the invention provides a mobile terminal for use in a communication network being divided in location areas to allow tracking the geographical position of mobile terminals. This mobile terminal comprises means for receiving an indication of a mobility group to which the mobile terminal is assigned or for selecting a mobility group, a processing unit for determining a change of the location area within the communication system and a transmitter for transmitting a group location update including an identifier of the mobility group to thereby trigger a location update for the mobility group members.

In a further embodiment of the invention the mobile terminal is operable to perform at least some of the steps of the method for tracking locations of mobile terminals according to one of the different embodiments of the invention described herein.

Moreover, according to another embodiment, the invention also provides a computer readable medium storing instructions that, when executed by a processor of a mobility control apparatus, cause the apparatus to track locations of mobile terminals in a communication network, by assigning at a mobility management entity mobile terminals to a mobility group, informing the mobile terminals on their mobility group membership, receiving at a serving mobility management entity of the communication network a group location update for the mobility group from a mobile terminal of the mobility group or a network operator trusted or controlled entity in the proximity of the mobile terminals of the mobility group, and updating the locations of the mobile terminals of the mobility group based on the group location update.

The computer readable medium according to a advantageous embodiment of the invention further storing instructions that, when executed by the processor, cause the apparatus to perform at least some of the steps of the method for tracking the locations of mobile terminal according to one of the various embodiment of the invention described herein.

Another embodiment of the invention relates to a computer readable medium storing instructions that, when executed by a mobile terminal for use in a communication network being divided in location areas to allow tracking the geographical position of mobile terminals, cause the mobile terminal to trigger a location update, by receiving an indication of a mobility group to which the mobile terminal is assigned or selecting a mobility group determining a change of the location area within the communication system, and transmitting a group location update including an identifier of the mobility group to thereby trigger a location update for the mobility group members.

Also this computer readable medium may optionally further storing instructions that, when executed by the processor, cause the apparatus to perform at least some of the steps of the method for tracking the locations of mobile terminal according to one of the various embodiment of the invention described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
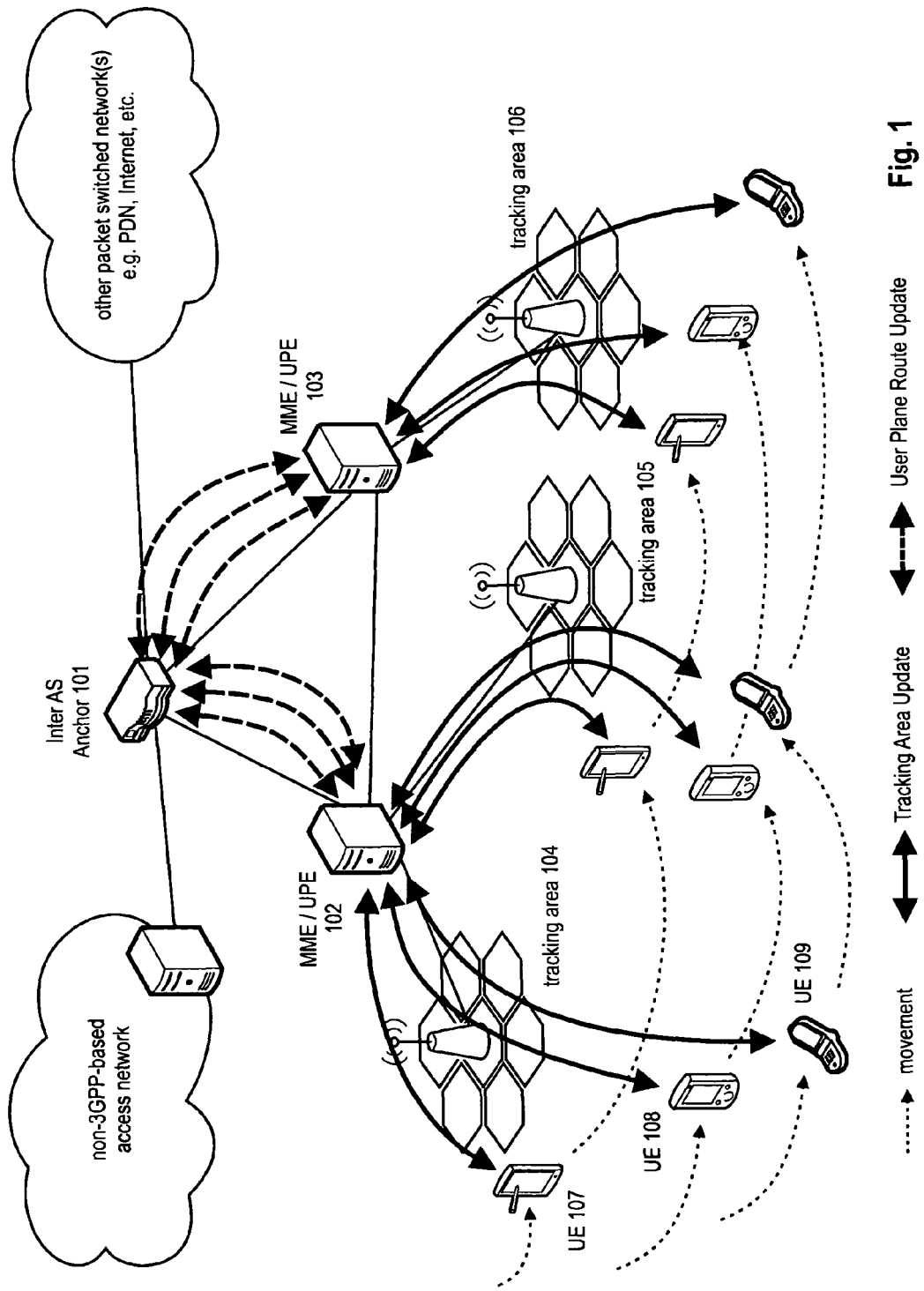
FIG. 1 shows a Tracking Area Update in an Evolved 3GPP System Architecture.

The following paragraphs will describe various embodiments of the invention. For exemplary purposes only, most of the embodiments are outlined in relation to an (evolved) UMTS communication system and the terminology used in the subsequent sections mainly relates to the UMTS terminology. However, the terminology and the description of the embodiments with respect to an UMTS architecture is not intended to limit the principles and ideas of the inventions to such systems.

Also the detailed explanations given in the Technical Background section above are intended to better understand the mostly UMTS specific exemplary embodiments described in the following and should not be understood as limiting the invention to the described specific implementations of processes and functions in the mobile communication network. Nevertheless, the improvements proposed herein may be readily applied in the architectures/systems described in the Technological Background section.

One main aspect of the invention is the grouping of mobile terminals to so-called mobility groups and to perform location updates per mobility group. It may be advantageous, to group the mobile terminals based on their movement pattern, based on the terminals choice or based on their location within the proximity of a network operator trusted or controlled entity, as will be exemplarily described further down below.

Further, it may also be advantageous to inform the terminals about the membership to a certain mobility group. When the mobility group moves and changes the tracking area (or location area) different mechanism for performing the location update will be suggested. For example, only one terminal in a mobility group or network operator trusted or controlled entity serving a mobility group may send a location area update to the respective serving mobility management entity in the network on behalf of the group.

In case a confirmation of the group location update is foreseen, a confirmation message from the network may be multicast or broadcast to all members of the mobility group.

In the context of this invention, a mobility group is thus a group of users which is expected to move together through location areas of a communication network.

As already indicated above, it may be further assumed that the communication network is fragmented/divided in so called location areas (or tracking areas, which is used as a synonym herein). Typically, but not limited thereto, these location areas are used by the communication network to track a mobile terminals location and to data to the terminal for example in case of a service provided to the terminal or if paging a terminal. Hence, by movement of the mobility group, the terminals of the group may enter a new location area and the new location area may be registered to maintain reachable for the system.

In this respect it should also be noted that the invention may be employed in heterogeneous networks, where for example a location area update may be necessary upon handover from a network using a first access technology to another network using another access technology. For example, considering a train to an airport, the mobile terminals in the train may be expected to move jointly as long as they are located on the train. On the train the terminals may for example be served by a mobile communication network, such as a 3GPP based network. When arriving at the airport providing WLAN access, the terminals may decide to switch to WLAN access and thereby change the location area. Also in this inter-access technology handover in a heterogeneous network, the overhead signaling may be reduced by using the group location update procedure according to the different embodiments outlined herein.

Similarly, when employing the invention in Mobile IP networks, the location update may be performed upon change of the domain, e.g. if the group is moving or connecting to a visited network.

Further, in the context of the invention the location update is registered by a so-called mobility management entity. The term entity is intended to denote that the mobility management entity is assumed to be a functional entity independent of its physical location in a specific network element. Hence, the mobility management entity may for example be located in a network element of the access or core network of the communication system, within the domain of a visited network in Mobile IP applications, etc.

In enhanced UMTS system as described in the Technical Background section above, the entity may correspond to the MME and may be located in a network element of the radio access network. Further, it may optionally be collocated with the UPE.

Figure 2:
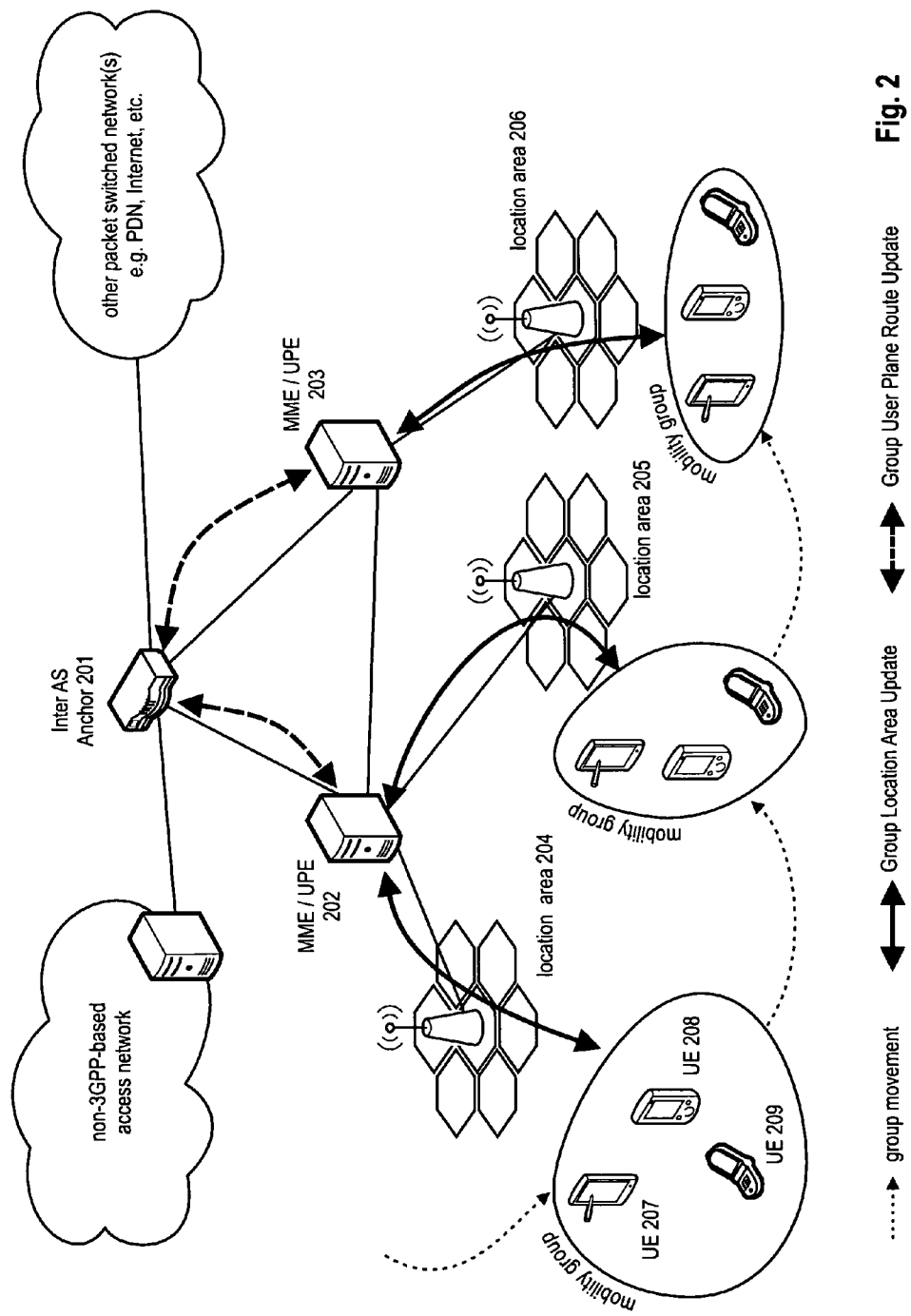
FIG. 2 shows an exemplary group location update of a mobility group moving through different location areas in a communication network according to an exemplary embodiment of the invention.

The concept of the invention is exemplarily outlined referring to FIG. 2 in the following. FIG. 2 exemplarily shows the grouping of mobile terminals (UEs) into a mobility group and a group location update procedure performed for the mobility group according to an embodiment of the invention. Similar to FIG. 1, an evolved UMTS system is assumed for exemplary purposes. Concerning the mobility management mechanisms to which also the registration of tracking/location areas belongs, it is to be noted that these functions will be typically performed by a mobility management entity, while the functions concerning routing may be provided by a user plane entity.

Generally, a mobility management entity may serve plural location areas in the network. Same may also be true for a serving user plane entity. However, in some cases, the change of the location area may be also accompanied by a change of the serving mobility management entity and/or the serving user plane entity (e.g. UPE) responsible for routing data to the terminals of a mobility group. In this exemplary embodiment, the mobility management entities and user plane entities are assumed to be collocated in MME/UPE 202 and MME/UPE 203. Further, it may be assumed that the mobility management entity and user plane entity collocated in a MME/UPE serve the same part of the 3GPP based access network, e.g. location area 204 and 205 for MME/UPE 202 and location area 206 for MME/UPE 202.

Initially the UEs 207, 208, 209 are grouped into a mobility group as they are assumed to move jointly through the network. Upon the terminals of the mobility group having entered location area 204, group location update procedure is performed for the mobility group with the serving MME/UPE 202. Since also the routing towards the mobility group members needs to be updated due to change of the serving UPE, a group user plane update may be initiated and performed with Inter AS Anchor 201.

The group location area update messages transmitted to the serving mobility management entity in the network comprise a mobility group identifier. The mobility management entity will determine group members based on the mobility group identifier so as to update the respective mobility related contexts of the group members.

Upon the mobility group moving again, here to location area 205, a group location area update procedure is performed with MME/UPE 202. This time no user plane route update is needed, since the same UPE (integrated in MME/UPE 202) serves location area 204 and location area 205.

Upon the terminals of the mobility group again moving to location area 205, another group location update is initiated. Since the user plane entity is changed, a user plane route update may also be performed so that the data destined to UEs 207, 208, 209 of the mobility group will be routed from Inter AS Anchor 201 to UPE/MME 203 and further to the UEs 207, 208, 209. Further, as also the serving mobility management entity changes for UEs 207, 208, 209, the MME/UPE 203 may resolve the previous MME/UPE 202 and may request the transfer of context information for the mobility group and the individual group members.

Generally, the prediction of mobile terminals that will move jointly through the network is difficult. However, in some scenarios, for example in public transportation, the movement of mobile terminals may be well predicted so that a grouping of jointly moving terminals is possible.

The following paragraphs elaborate how signaling optimizations may be achieved by taking into account the movement of groups of users according to different embodiments of the invention.

In a first step a mobility group must be formed, i.e. mechanisms are required for detecting that several mobile terminals will move or are moving together. In a next step signaling traffic can be optimized, by for example by aggregating a number of signaling messages into a single message.

Group Detection/Registration

For group selection/detection different mechanisms are possible. In one exemplary embodiment of the invention user action is required. In this embodiment, the user may set the mobility group membership manually. For example the user can participate in group mobility procedures by mobile terminal menu-driven means. E.g. the user may enter a unique code, representing the group ID. The terminal may then send a group registration message together with the group ID and a terminal ID (e.g. temporary identity of the terminal) to its serving mobility management entity in the network.

Upon reception of the registration message the mobility management will include the mobile terminal in the indicated mobility group and will update the terminals location area upon reception of a location update for the mobility group.

In this first exemplary scenario deregistration from a mobility group may be user-controlled as well. If the user desires to leave the mobility group it may use a menu of the terminal to deregister manually. In response to the user interaction, the terminal will send a group deregistration message to the mobility management entity, which will remove the terminal from the mobility group.

In another exemplary embodiment of the invention a terminal may detect a group announcement (including a group ID) that is broadcast on an air interface. The broadcast of the announcement may not necessarily be provided via the same access technology for which location updates are to be performed. E.g. the announcement may be received via WLAN or Bluetooth while the mobility group may relate to tracking of the group members location within a UMTS network.

In this embodiment no user interaction may be required. After receiving the announcement, the terminal may send a group registration message together with the group ID and the terminal ID (e.g. temporary identity) to a mobility management entity. And also in absence of the group announcement, because the terminal may have left the group, the terminal may automatically send a message to the mobility management entity to deregister from the group.

In a further embodiment of the invention an entity in the proximity of the terminal is used to detect group mobility. For example, considering a scenario where users/terminals enter a train, it may be expected that all terminals of the users will move jointly from location area to location area upon departure of the train. In this case the entity may be a "fixed" network element in the train that collects identifiers of the terminals entering the train and may inform a serving mobility management entity on the terminals (by means of the identifiers) that have entered the train so that same may be assigned to a common mobility group.

For example if terminals have an individual RFID tag, same may be scanned by the entity when the terminals are entering a train or a train station. Radio Frequency Identification (RFID) is an automatic identification method, relying on storing and remotely retrieving data using devices called RFID tags or transponders. An RFID tag is a small object that, in this exemplary embodiment of the invention, would be attached to or incorporated into the mobile terminals. RFID tags typically contain silicon chips and antennas to enable them to receive and respond to radio-frequency queries from an RFID transceiver which would be the entity mentioned above collecting the RFID identifiers of the mobile terminals in its communication range.

It may be further advantageous if the entity collecting the mobile terminal IDs is either network operator controlled or network operator trusted. Hence, the network operator controlled or trusted entity may for example a built-in network element or a special mobile terminal.

This network operator controlled or trusted entity may transfer the identities scanned from the RFID tags of the mobile terminals optionally together with another ID, identifying at least the operator controlled/trusted entity, to the mobility management entity serving the current location area. When having received the scanned identities the mobility management entity may determine the permanent IDs of the terminals (or corresponding temporal IDs assigned to them by the network) and assigns a (multicast) group identifier to the terminals. Using this (multicast) group identifier, the mobility management entity may confirm a location update as will be explained further down below.

In a variation of this embodiment, the mobile terminals are Bluetooth enabled and form an ad-hoc network. In this case one of the terminals being network operator trusted may collect identifiers of the other mobile terminals in its vicinity and may inform the serving mobility management entity using similar mechanisms as described above.

In a further embodiment of the invention the communication network may record movement patterns of terminals. Also in this embodiment no user interaction is required and even more, the mobile terminal must not even be involved in the group detection.

For determining a movement pattern of a terminal, the network (e.g. a serving mobility management entity) may track the location updates of a terminal for a certain period of time and if two or more terminals have the same mobility pattern, they are assigned to a mobility group. Optionally, the mobile terminal may assist the network in the group detection, for example by collecting the cell ID, cell sojourn time, etc. and reporting them during a location update to the serving mobility management entity. Based on this information the network may detect faster that groups of users are moving together.

Group Signaling Traffic Optimization

After the mobility group has been formed, the mobility management related signaling may be optimized. In this connection, according to one embodiment of the invention, the mobility management entity informs the mobility group members about the membership to a mobility group. This may for example be accomplished by a group location area registration Confirmation message that includes a mobility group ID and optionally specifies which group location area update procedure is to be used for updating the group's location area.

Group Location Registration Mechanism

For the group location area update procedure different mechanisms are possible. According to one embodiment of the invention a preconfigured tracking area registration terminal in the network is used or that the mobility management entity may dynamically select a proxy tracking area registration terminal. Hence, in this exemplary embodiment always the same terminal within a mobility group sends the group location area registration messages when the tracking area for the group of terminals changes.

One example for the location area registration procedure with a preconfigured proxy tracking area registration terminal may be the exemplary embodiment regarding the use of a network operator trusted or controlled entity, where an RFID system for "collecting" identifiers of terminals within the vicinity of the network operator controlled/trusted entity. Also one of the mobile terminals in the location area may be the operator trusted entity as described above.

In this exemplary scenario this designated special terminal sends group location area registration messages with the mobility group ID on behalf of the group members. When the serving mobility management entity receives this group location area registration, it updates all mobility management related context information of the terminals in the mobility group.

The mobility management entity may further confirm the correct registration to all terminals, in order to make it possible for the mobility group members to detect changes to the mobility group. E.g. if a mobile terminal recognizes that it is not located in the location area registered for the mobility group to which it belongs, it may decide to leave from the group; similarly if detecting packet loss at a group member upon update of the location area, the respective group member may leave or change the mobility group.

Therefore, the mobility management entity sends a group location area registration confirmation message to the mobility group terminals after the context information has been updated. This may for example be realized by transmitting a single multicast message to all terminals within the group using the (multicast) mobility group ID. For this all terminals in the group are listening on a broadcast/multicast channel for messages addressed to the group ID. Thus, (independent of the group location registration mechanism) every terminal could start a timer after recognizing the location area change and in case a terminal does not receive the group location area registration confirmation, e.g. until expiry of the timer, it may send a normal location area registration message by its own to the mobility management entity which should, in response thereto, remove the terminal from the mobility group.

If one or several terminals move to a new location area and don't receive a group location area registration confirmation, these terminals may send a normal location area registration. In this case, if the mobility management entity has changed, the new mobility management entity would not be aware of the mobility group and would send a context request with the terminal IDs to the old mobility management entity. In response to this request, the old mobility management entity may transfer the terminals' contexts to the requesting mobility management entity and may remove the terminals from the mobility group.

If the designated special terminal performs a group location area registration after change of the location area, but one or several of the terminals in the mobility group have not moved, they can not detect the leave from the group in case the group location area registration confirmation is sent on a broadcast/multicast channel in the new location area only. Therefore, in one embodiment of the invention the group location area registration confirmation is also send on a broadcast/multicast channel in the old location area. If in this scenario the mobility management entity of the mobility group has also changed, the new mobility management entity may send a context request message to the old mobility management entity to retrieve the context information of the mobility group and in addition to initiate a group location area registration confirmation in the old location area. If a terminal in the old location area receives the group location area registration confirmation message and recognizes that its location is different from the group's location, the terminal may send a normal location area registration message. Then, the old mobility management entity may remove the mobile terminal from the mobility group or may trigger by a context request message send to the new mobility management entity the removal of the terminal from the mobility group.

By movement of the group members, the terminals may become distributed over several location areas served by different new mobility management entities the old mobility management entity may need to relay the context requests to the new mobility management entities as necessary.

Another example for the location area registration procedure with a dynamic proxy tracking area registration terminal according to another embodiment of the invention could be realized by the mobility management entity determining one terminal from the mobility group that is to send the group location area registration messages on behalf of the group. For instance, the terminal of the mobility group may be designated to update the group's location area for a certain period of time (a given or configurable time span, until leaving the group, etc.); after elapse of this period another terminal of the mobility group may be determined.

Another mechanism for a dynamic group location area update procedure according to another embodiment of the invention is to use a broadcast/multicast random delay mechanism. A maximum delay value that may dependent on the size of the mobility group is transmitted in a group membership message from the mobility management entity to the terminals of the mobility group and any terminal may randomly send the group location area registration message. After having changed the location area all (or a selection of) the mobility group terminals are starting a random timer and are listening to a broadcast/multicast channel. If the timer of a respective terminal expires and no other terminal has (already) sent a group location area registration message on the broadcast/multicast channel, the respective terminal sends the group location area registration message to the serving mobility management entity via the broadcast/multicast channel.

Also in this embodiment of the invention the mobility management entity may confirm the registration by transmitting/multicasting/broadcasting a confirmation message to all terminals of the mobility group.

When the mobility management entity receives location area registration messages from more than one terminal of a mobility group indicating different location areas, the mobility management entity knows that at least one terminal has left the group, but it does not know which terminals left the group. One option to solve this problem is to send a group location area confirmation message to all registered location areas and to request all terminals in the concerned mobility group (optionally except for the terminals in one location area) to perform a conventional location area registration procedure as described previously herein. When receiving the conventional location area registration (e.g. a so-called Tracking Area Registration within an enhanced UMTS system) the mobility management entity knows again which terminals are located together in a location area and it may assign the terminals of the location areas to a new mobility groups, respectively, having a new group IDs.

Terminals of a mobility group that receive a group location area registration message on the broadcast/multicast channel will cancel the registration message delay timer and will start another timer to wait for the group location area confirmation message. When the registration message itself is not received, the delay timer is cancelled (if still running) after the registration confirmation is received from mobility management entity. If the group location area confirmation message is not received until one of the timers expires, the terminal will send the group location area registration message again.

In the exemplary embodiments of the invention above, the mobile terminals within mobility group may be idle mode (e.g. in UMTS, the terminals are attached to the radio network, but have no radio bearer established) and the group location area registration is only sent when the location area is changed.

In case a terminal of the mobility group is in active mode (e.g. in UMTS, the terminal is attached and a radio bearer is established), the group mobility mechanism according to the different embodiments described above may be further optimized. In this exemplary scenario, the mobility of the group may be tracked by evaluating the mobility information obtained for the terminal in active mode. In active mode, the location of the active terminal may for example be known by the mobility management entity at higher level of accuracy, e.g. on radio cell level within a wireless network. Thus, in case a terminal within the mobility group needs to be paged, it may only be necessary to page the terminal in the radio cell in which the active terminal is located instead of all radio cells of a location area. Hence, in this exemplary embodiment of the information, the mobility related context information on the location of the mobility group in the mobility management entity may be updated every time the active terminal moves to another radio cell.

In case multiple terminals in a mobility group are in active mode, according to another embodiment of the invention, some signaling messages, e.g. location updates like the switch of the path from old eNodeB to new eNodeB can be aggregated and therefore mobility management optimized.

As can be recognized from the description of the different embodiments so far, the group mobility procedures may allow for reducing mobility related signaling in the communication network (and via the air interface) and also may allow for reducing power consumption of the terminals.

Group Mobility Signaling Procedure

Figure 3:
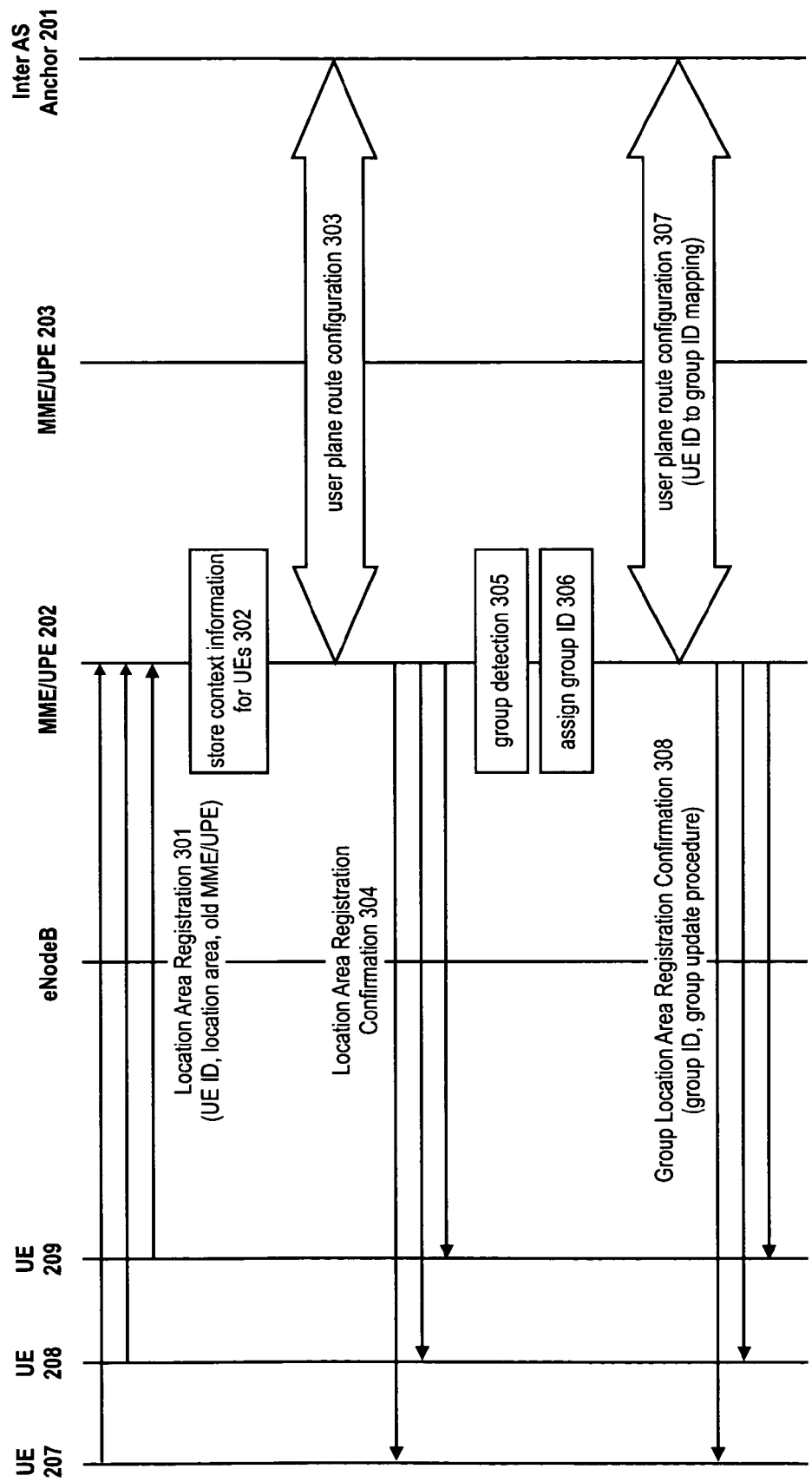
FIG. 3 shows an exemplary signaling procedure for forming mobility management groups in an evolved 3GPP system according to an exemplary embodiment of the invention.

FIG. 3 illustrates an exemplary signaling procedure for forming mobility management groups in an evolved 3GPP system according to an exemplary embodiment of the invention.

Initially, it may be assumed that the terminals UE 207, 208 and 209 (the number of terminals is only exemplary) are not yet associated to a mobility group. Upon entering a location area served by MME/UPE 202, each of them sends 301 Location Area Registration messages to MME/UPE 202. The Location Area Registration messages may comprise an UE identifier of the respective UE (e.g. a temporary or permanent ID of the UE) and the new location area. Optionally, the Location Area Registration message may also comprise the old MME/UPE and/or the old location area, which may be advantageous in case of a location update including a serving MME/UPE change as will be outlined with below referring to FIG. 5.

MME/UPE 202 may (create and) store 302 context information for each terminal including among others the mapping of the UE identifiers to a permanent identity and the last location area. If there was a change of the user plan route due to a change of the user plane entity, the MME/UPE 202 may perform 303 a User Plane Route Configuration procedure with Inter AS Anchor 201 for each of the UEs so as to update the routing of data to the respective UEs. It should be noted that initially it may be advantageous (but not mandatory) to configure routing for the UEs individually so that when performing a Group User Plane Update at a later point in time (see e.g. FIG. 5, 504) the respective routing contexts for the UEs 207, 208 and 209 are established at the Inter AS Anchor 201 and may be updated.

Upon having successfully configured routing, MME/UPE 202 may confirm 304 the location area update by sending a Location Area Registration Confirmation message to every terminal that has sent a registration message.

Next, the network, in this exemplary embodiment MME/UPE 202, may detect 305 that UE 207, 208 and 209 are moving together and decides to utilize group mobility procedures to reduce control signaling in the network. Different mechanisms for detecting that mobile terminals move jointly through the network may be used as described herein previously. Thus, MME/UPE 202 assigns 306 a group ID to UE 207, 208 and 209 that are assigned to and for a mobility group. MME/UPE 202 may further store the information and the association between mobility group ID and the UE identifiers of the group members in a group mobility context or stores the assigned mobility group ID within the individual UE contexts of the group members so as to be able to identify the UEs of a mobility group by means of the mobility group ID upon receiving a group location update request or a request for transferring the contexts of mobility group members to another MME/UPE.

The MME/UPE 202 may proceed with informing 307 the Inter AS Anchor 201 on the mobility group and on the UEs having been assigned to the group. In the signaling between MME/UPE 202 and Inter AS Anchor 201, MME/UPE 202 may include the mobility group ID assigned to the mobility group and UE identifiers of the UEs belonging to the group. The Inter AS Anchor 201 will store the information and the association between mobility group ID and the UE identifiers of the group members so as to be able to resolve a mobility group ID upon updating the user plane route for a mobility group.

Further, MME/UPE 202 may also inform 308 UEs 207, 208 and 209 on their assignment to a mobility group and that they should perform group mobility procedures for future location updates. This may for example be accomplished by sending a Group Location Area Registration Confirmation message to all UEs in the mobility group. The Group Location Area Registration Confirmation message may include the assigned group ID and optionally the group update procedure together with associated other parameters, e.g. maximum random delay value, for instructing the UEs of the mobility group to use a specific mechanism for the group location updates (as for example outlined previously herein).

Figure 4:
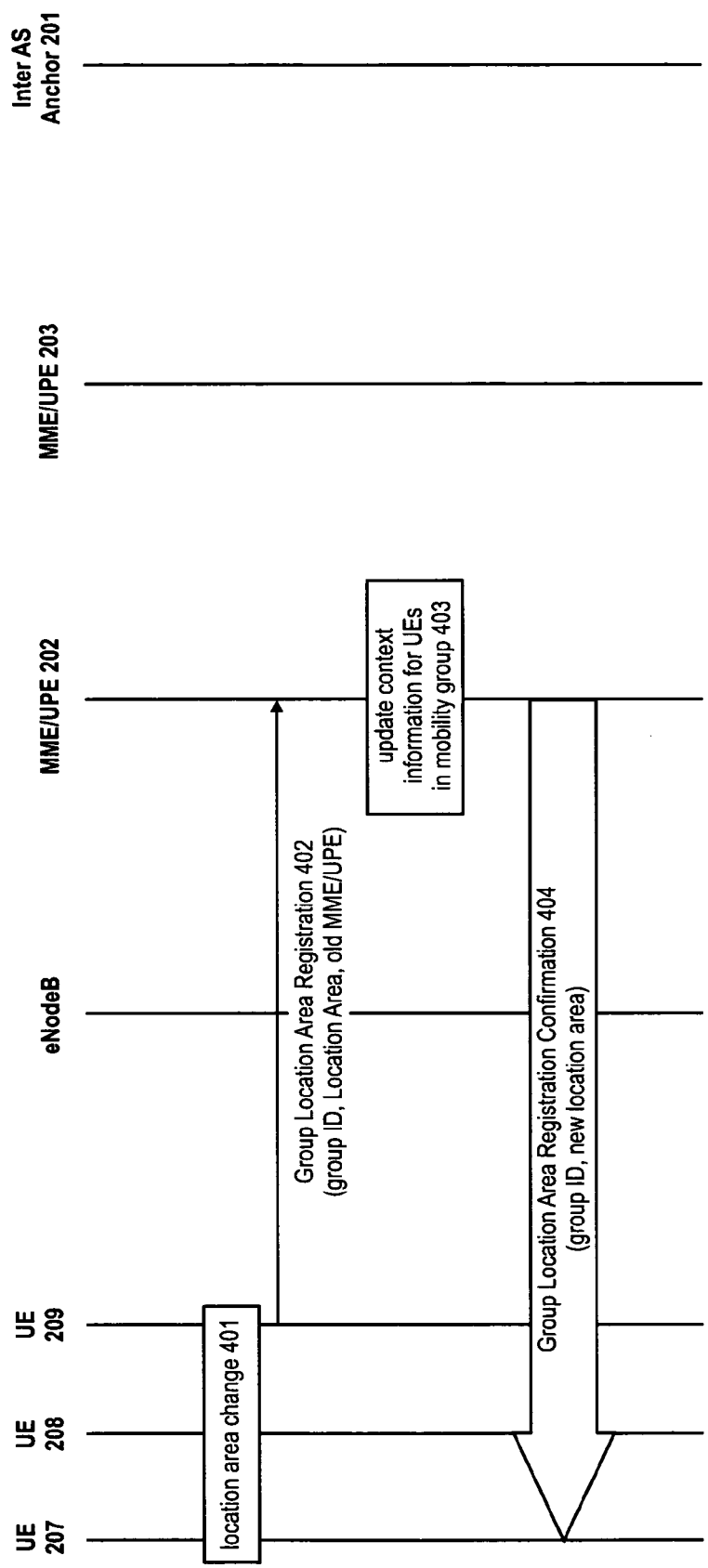
FIG. 4 shows an exemplary signaling procedure of a group location update without mobility management entity change in an evolved 3GPP system according to an exemplary embodiment of the invention.

Next, the signaling upon a location area change of mobility group members will be outlined. FIG. 4 shows an exemplary signaling procedure of a group location update without mobility management entity change in an evolved 3GPP system according to an exemplary embodiment of the invention.

Upon change 401 of the location area, one of the terminals of the mobility group (e.g. a preconfigured tracking area registration terminal or a UE designated by a random delay mechanism, as explained above) sends 402 the group location area registration message to the MME/UPE 202 on behalf of the mobility group. This group location area registration message may be sent via a dedicated channel or via broadcast/multicast, so that other terminals in the mobility group may receive the registration message, which may be advantageous when using a random delay mechanism. Hence, according to an embodiment of the invention the channel type, i.e. designated, multicast or broadcast may depend on the group location update procedure to be used, as optionally designated in the Group Location Area Registration Confirmation (see FIG. 4).

Upon reception of the group location area registration message, MME/UPE 202 will update 403 the location area of the mobility group members and may confirm the update by sending 404 the group location area registration confirmation to the group members. This confirmation may for example be provided to the UEs of the mobility group via broadcast/multicast, so that only one confirmation message is necessary.

The group location area registration message sent by a member of the mobility group includes the mobility group ID and (new) location area for allowing MME/UPE 202 to determine the mobility group members and to update the location area in the UE contexts of the UEs belonging to the indicated mobility group.

Figure 5:
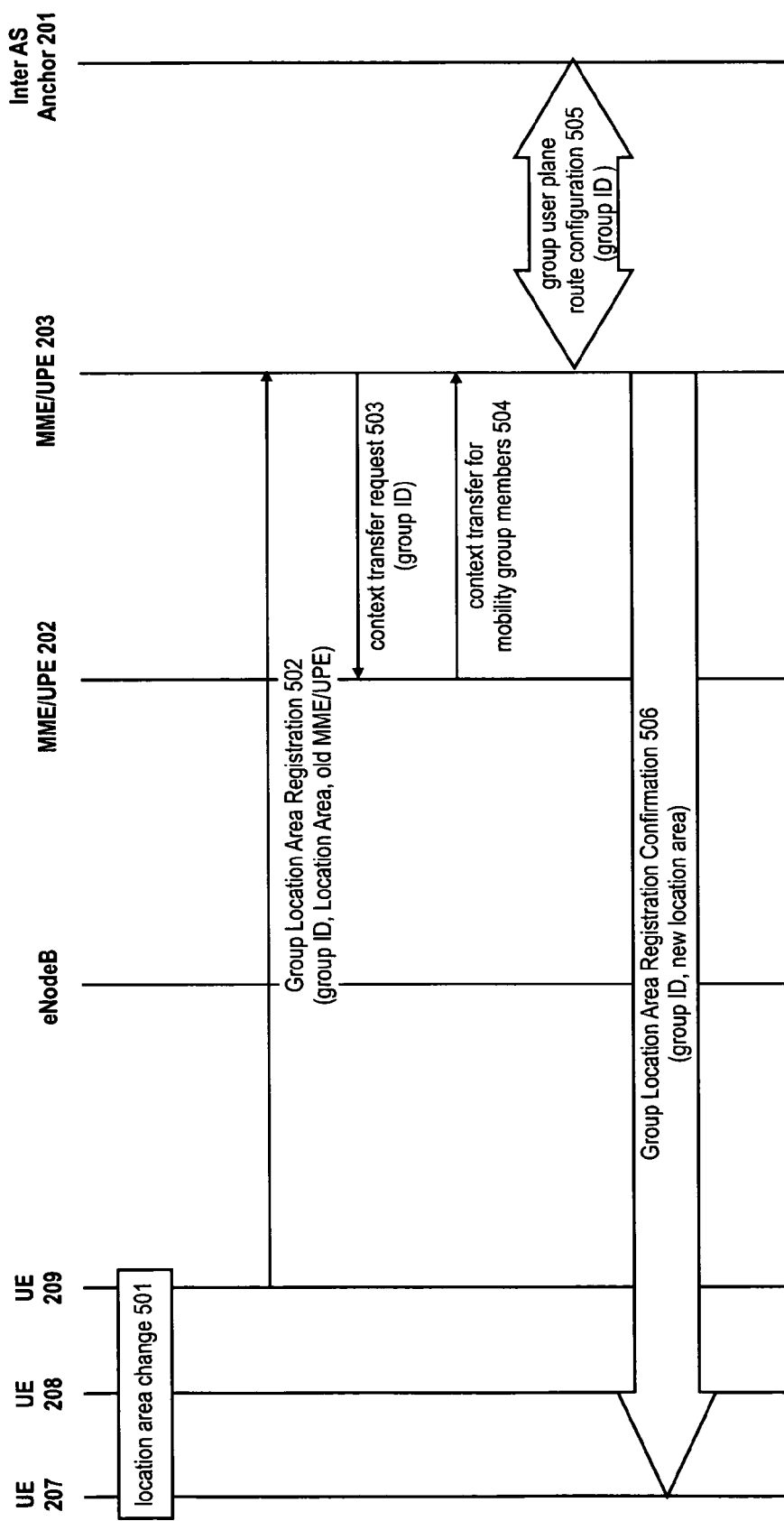
FIG. 5 shows an exemplary signaling procedure of a group location update with mobility management entity change in an evolved 3GPP system according to an exemplary embodiment of the invention.

Further, a group location area registration message may optionally include an identification of the old MME/UPE, which may be feasible in case the serving MME/UPE changes when the mobility group members move to a new location area. This latter case will be elaborated on in the following. FIG. 5 shows an exemplary signaling procedure of a group location update with mobility management entity change in an evolved 3GPP system according to an exemplary embodiment of the invention.

Steps 401 and 402 in FIG. 4 and steps 501 and 502 in FIG. 5 are essentially similar. The only difference is that in step 502 the group location area registration message is sent to MME/UPE 203, i.e. when changing the location area a new MME/UPE is serving the mobility group.

Based in the unknown mobility group ID indicated in the group location area registration message and/or based on the identifier of the old MME/UPE or an indication of a previous location area in the group location area registration message, MME/UPE 203 recognizes that the MME/UPE has changed for the mobility group. Thus, in case the old MME/UPE is not explicitly referred to in the group location area registration message, MME/UPE 203 will resolve the previous MME/UPE, which is assumed to be MME/UPE 202 in this exemplary example.

If the MME/UPE for the mobility group has changed, new MME/UPE 203 requests 503 the UE contexts of the group members and optionally further context information on the mobility group from old MME/UPE 202. To identify the required information the mobility group ID in the group location area registration message is included in this context request. In response thereto, MME/UPE 202 transfers 504 the requested UE contexts and optionally the additional mobility group related context information to new MME/UPE 203.

Moreover, for exemplary purposes it is assumed in the embodiments related to FIG. 3 to 5 that the mobility management entity and user plane entity are collocated in MME/UPE 202 or 203, respectively. Since a change of the mobility management entity thus implies also a change of the user plane entity in this exemplary configuration, MME/UPE 203 sends 505 a user plane route (re)configuration message including the mobility group ID to Inter AS Anchor 201 in order to update the route for data destined to the mobility group members. Inter AS Anchor 201 will resolve the mobility group ID to identify the group members and updates the routing information in the UE contexts of the mobility group members. Moreover, Inter AS Anchor 201 may confirm the user plane route update.

Next, MME/UPE 203 confirms the location update for the mobility group by sending 506 a group location area registration confirmation message to the group members as explained in connection with FIG. 4, step 404.

In some exemplary embodiment of the invention group detection by means of using a RFID system is proposed, i.e. the RFID of mobile terminals is scanned e.g. at the entrance of a train station. This information transmitted may probably not be sufficient to already detect a group moving together, because after entering the station not all terminals may move in the same direction. Thus, additional means may be foreseen required. One option to improve a RFID based group detection may be to wait until the next Tracking Area Registration message is received from a respective terminal. Then all terminals sending the registration with the same Tracking Area may be grouped together.

Another possibility may be to group the mobile terminals upon entering the train station (and upon having received their IDs from the RFID transceiver) and to inform them about the membership to the group. Then, in case a proxy tracking area registration terminal is used, all terminals not in the same tracking area as the proxy tracking area registration terminal will not receive a broadcast/multicast group location area registration confirmation message and send a Tracking Area Registration message. The MME/UPE may then inform the terminals about the membership to a new mobility group together with a new mobility group ID.

In case the Broadcast/Multicast Random Delay mechanism is used, the procedure can be similar to the scenario where terminals have left the group described above in the Group Location Registration Procedure section.

The scan of the RFID makes it possible to track the mobility of the terminal, even for other systems different from the mobile home operator. One possibility according to an embodiment of the invention to overcome this issue is to have a changeable identity transmitted during the RFID scan. For example one of the temporary identities, which has been assigned from the MME/UPE to the terminal during network attachment or registration, can be used and transmitted during RFID scan.

Further, in case a terminal deregisters from a mobility group or is deregistered from a mobility group by a mobility management entity, the mobility management entity may also inform the Inter AS Anchor on the deregistration so as to allow same to update its context information related to the mobility group from which the terminal becomes deregistered. For example, the mobility management entity may include a UE identifier and the mobility group ID in a deregistration message to the Inter AS Anchor. If several terminals are to be deregistered the deregistration message may include several UE identifiers and the mobility group ID.

Most of the embodiments of the invention described above have been outlined with respect to employing the invention in a cellular network environment. However, the different mechanisms described herein are not limited to cellular networks and may also be applied, e.g. to network enabling mobility based on Mobile IP as discussed in the Technical Background section. With Mobile IP the location area registration messages are equivalent to Binding Updates (BU) and the location registration confirmation messages are equivalent to Binding Update Acknowledgements (BACK). Thus, for Mobile IP environments, Group Binding Updates (GBU) on behalf of a mobility group may be sent and the Group Binding Updates may be confirmed—e.g. via broadcast or multicast—by a Group Binding Update Acknowledgement (GBACK).

The messages themselves are transmitted between the Mobile IP terminals and the Home Agent (HA).

There are several possibilities how the GBU and BACK message may be formatted. E.g. the GBU could be a normal binding update, but the home agent knows that the binding update from a specific node is for a mobility group so that also the Care-of Address (CoA) of all group members needs to be changed. Another possibility is that the GBU is similar to a common BU but includes an additional bit indicating whether the BU is a normal BU or a GBU. A further alternative implementation may be the definition of a new MIPv6 mobility header type, or new mobility option (indicating group update) for a BU. Similarly, also the BACK may be extended by an additional bit indicating that the CoAs of all group members have been updated by the HA.

In contrast to the cellular network environment every mobile terminal in MIPv6 or MIPv4 with collocated CoA has to configure a new CoA after the hand over to a new subnet. This CoA is different for each terminal. In case of stateless CoA configuration, one possibility for the home agent to derive the CoA of other terminals from the CoA send in a GBU from only one terminal, is by concatenating the prefix from the CoA in the GBU with the interface identifier from the old CoAs stored in the Binding Cache.

In case of MIPv4 with a Foreign Agent CoA the mobile terminal needs not to configure a new CoA by itself. Here an IP address of the Foreign Agent is used as CoA and thus, the HA can use the same CoA for all terminals.

If statefull IP address configuration is used to assign the CoA (e.g. by DHCP), the network knows the CoAs and they can be transferred in an aggregated manner to the HA. And similar in a Proxy MIP scenario the AR can send aggregated Binding Updates to the HA for the group.

In order to aggregate BACKs, an IP multicast address can be assigned to the terminals in the group and the BACKs are sent to the multicast address, instead of the unicast addresses.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

The invention claimed is:

1. A method for tracking locations of mobile terminals in a communication network, the method comprising:
    assigning by a mobility management entity mobile terminals to a mobility group, and informing the mobile terminals on their mobility group membership,
    receiving by a serving mobility management entity of the communication network a group location update for the mobility group from a mobile terminal of the mobility group or a network operator trusted or controlled entity, and updating the locations of the mobile terminals of the mobility group based on the group location update, and
    sending by the serving mobility management entity a confirmation for the group location update to the mobile terminals of the mobility group.

2. The method according to claim 1, further comprising scanning by the network operator trusted or controlled entity terminal identifiers of mobile terminals in the proximity of the network operator trusted or controlled entity and providing the scanned identifiers to the mobility management entity.

3. The method according to claim 2, further comprising assigning the mobile terminals identified by their respective terminal identifier to a mobility group associated to the network operator trusted or controlled entity.

4. The method according to claim 3, further comprising informing the identified mobile terminals on the mobility group to which they have been assigned.

5. The method according to claim 2, wherein the group location update is transmitted by the network operator trusted or controlled entity to the serving mobility management node.

6. The method according to claim 5, wherein the group location update comprises an indication of at least one of
    at least one radio cell ID of at least one radio cell from which the mobile terminal receives or has received a beacon signal when/before sending the group location update, a radio cell sojourn time in the respective radio cell and an average radio cell sojourn time in the visited radio cells since sending the last group location update.

7. The method according to claim 1, further comprising determining a movement pattern of a respective mobile terminal and assigning the respective mobile terminal to a mobility group based on the movement pattern.

8. The method according to claim 7, wherein the movement pattern is determined by the mobility management entity tracking location updates of the respective mobile terminal.

9. The method according to claim 7, wherein the group location update comprises an indication of at least one of:
    at least one radio cell ID of at least one radio cell from which the mobile terminal receives or has received a beacon signal when/before sending the group location update, a radio cell sojourn time in the respective radio cell and an average radio cell sojourn time in the visited radio cells since sending the last group location update.

10. The method according to claim 7, wherein mobile terminals having a similar movement patters are assigned to the same mobility group.

11. The method according to claim 1, further comprising:
    broadcasting or multicasting a group identifier of the mobility group, and
    receiving at the mobility management entity a registration message from a mobile terminal, the registration message comprising the group identifier and a mobile terminal identifier,
    wherein the mobility management entity assigns the mobile terminal to the mobility group identified by the group identifier.

12. The method according to claim 1, further comprising receiving from a mobile terminal a registration message comprising a group identifier, and wherein the mobility management entity assigns the mobile terminal to a mobility group identified by the group identifier.

13. The method according to claim 1, further comprising receiving at the mobility management entity a group deregistration from a mobile terminal, and deregistering the mobile terminal from the mobility group in response thereto.

14. The method according to claim 1, wherein only a selected mobile terminal out of the mobile terminals belonging to a mobility group provides a group location update for all mobility group members to a serving mobility management entity.

15. The method according to claim 1, wherein the mobile terminals belonging to a mobility group randomly provide a group location update for all mobility group members to a serving mobility management entity.

16. The method according to claim 1, further comprising reconfiguring a user plane route for the mobile terminals assigned to the mobility group.

17. The method according to claim 16, wherein the user plane route is reconfigured upon change of the serving user plane entity responsible for routing user plane data to the mobile terminals of the mobility group.

18. The method according to claim 1, further comprising transferring mobility-related contexts from a previous mobility management entity to the serving mobility management entity upon reception of a group location update.

19. The method according to claim 18, wherein the transfer of the mobile terminal contexts is initiated by the serving mobility management entity by sending a message comprising at least a group identifier comprised in the group location update to the previous mobility management entity.

20. The method according to claim 18, further comprising identifying the previous mobility management entity by comprising an identifier of the previous mobility management entity to the group location update or by resolving a previous location indicated in the group location update.

21. The method according to claim 1, further comprising transferring routing-related contexts from a previous user plane entity to a serving user plane entity upon reception of a group location update.

22. The method according to claim 21, wherein the transfer of the mobile terminal contexts is initiated by the serving mobility management entity by sending a message comprising at least a group identifier comprised in the group location update to the previous mobility management entity.

23. The method according to claim 21, further comprising identifying the previous mobility management entity by comprising an identifier of the previous mobility management entity to the group location update or by resolving a previous location indicated in the group location update.

24. A method for tracking locations of mobile terminals in a communication network, the method comprising:
grouping the mobile terminals into at least one mobility group,
performing a location update on a per-mobility group basis, and
sending a confirmation for the location update to the mobile terminals grouped into the at least one mobility group.

25. The method according to claim 24, wherein only one of the mobile terminals in a mobility group sends the location update on behalf of the mobility group to trigger the location update for the mobility group.

26. The method according to claim 24, wherein a network operator trusted or controlled entity sends the location update on behalf of the mobility group to trigger the location update for the mobility group.

27. An apparatus for tracking locations of mobile terminals in a communication network, the apparatus comprising:
a processing unit that assigns terminals to a mobility group,
a transmitter that informs the mobile terminals on their mobility group membership, and
a receiver that receives a group location update for the mobility group from a mobile terminal of the mobility group or a network operator trusted or controlled entity,
wherein the processing unit is operable to update the locations of the mobile terminals of the mobility group based on the group location update, and
wherein the transmitter transmits a confirmation for the group location update to the mobile terminals of the mobility group.

28. A communication system for tracking locations of mobile terminals in a communication network, the communication system being configured to:
group the mobile terminals into at least one mobility group,
perform a location update on a per-mobility group basis, and
send a confirmation for the location update to the mobile terminals grouped into the at least one mobility group.

29. A mobile terminal for use in a communication network being divided in location areas to allow tracking the geographical position of mobile terminals, the mobile terminal comprising:
a receiver that receives an indication indicating a mobility group to which the mobile terminal is assigned or enabling the mobile terminal to select a mobility group,
a processing unit that determines a change of the location area within the communication network, and
a transmitter that transmits a group location update including an identifier of the mobility group to thereby trigger a location update for the mobile terminals grouped into the mobility group,
wherein a confirmation for the location update is sent to the mobile terminals grouped into the mobility group.

30. A non-transitory computer readable medium storing instructions that, when executed by a processor of a mobility control apparatus, cause the mobility control apparatus to track locations of mobile terminals in a communication network, by:
assigning by a mobility management entity mobile terminals to a mobility group,
informing the mobile terminals on their mobility group membership,
receiving by a serving mobility management entity of the communication network a group location update for the mobility group from a mobile terminal of the mobility group or a network operator trusted or controlled entity in the proximity of the mobile terminals of the mobility group,
updating the locations of the mobile terminals of the mobility group based on the group location update, and
sending by the serving mobility management entity a confirmation for the group location update to the mobile terminals of the mobility group.

31. A non-transitory computer readable medium storing instructions that, when executed by a mobile terminal for use in a communication network being divided in location areas to allow tracking the geographical position of mobile terminals, cause the mobile terminal to trigger a location update, by:
receiving an indication indicating a mobility group to which the mobile terminal is assigned or enabling the mobile terminal to select a mobility group,
determining a change of the location area within the communication network,
transmitting a group location update including an identifier of the mobility group to thereby trigger a location update for the mobile terminals grouped into the mobility group, and
transmitting a confirmation for the location update to the mobile terminals grouped into the mobility group.

* * * * *